(12) United States Patent
Sano et al.

(10) Patent No.: US 6,284,029 B1
(45) Date of Patent: *Sep. 4, 2001

(54) YELLOW INK REALIZING IMAGE HAVING EXCELLENT LIGHTFASTNESS AND COLOR DEVELOPMENT

(75) Inventors: Tsuyoshi Sano; Kiyohiko Takemoto, both of Nagano (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/311,476

(22) Filed: May 13, 1999

(30) Foreign Application Priority Data

May 19, 1998 (JP) .................................................. 10-136809
Jan. 25, 1999 (JP) .................................................. 11-015456

(51) Int. Cl.⁷ .................................................. C09D 11/02
(52) U.S. Cl. .................. 106/31.6; 106/31.68; 106/31.77; 106/31.78; 106/31.8; 106/31.81; 106/31.85
(58) Field of Search ............................... 106/31.6, 31.68, 106/31.77, 31.78, 31.8, 31.81, 31.85

(56) References Cited

U.S. PATENT DOCUMENTS 5,679,142 * 10/1997 McInerney et al. ................ 106/31.6
5,738,716 * 4/1998 Santilli et al. ..................... 106/31.77
5,843,220 * 12/1998 Babler ................................ 106/31.6
5,846,306 * 12/1998 Kubota et al. ..................... 106/31.75
5,859,092 * 1/1999 Hirasa et al. ....................... 106/31.6

FOREIGN PATENT DOCUMENTS 0761459    3/1997  (EP) .
0778321    6/1997  (EP) .
2316412    2/1998  (GB) .
10025440   1/1998  (JP) .
1025440    1/1998  (JP) .
11-012508  1/1999  (JP) .
11-209672  8/1999  (JP) .

OTHER PUBLICATIONS

Derwent Publications Ltd., Abstract JP 10 025440, Jan. 27, 1998.
Patent Abstract of Japan of 1025440 Dated Jan. 27, 1998.
Abstract of JP 11–012508 Jan. 1999 Japan.
Abstract of JP 11–209672 Aug. 1999 Japan.

* cited by examiner

*Primary Examiner*—Helene Klemanski
*Assistant Examiner*—Veronica F. Faison
(74) *Attorney, Agent, or Firm*—Ladas & Parry

(57) ABSTRACT

A yellow ink composition for ink jet recording is provided which possesses excellent lightfastness and in addition can retain excellent color development for a long period of time. The yellow ink composition comprises both C.I. Pigment Yellow 74 and at least one second yellow pigment selected from the group consisting of C.I. Pigment Yellow 109, 110, 128, 150, and 154.

16 Claims, No Drawings

YELLOW INK REALIZING IMAGE HAVING EXCELLENT LIGHTFASTNESS AND COLOR DEVELOPMENT

BACKGROUND OF THE INVENTION

1. Field of the Invention

The present invention relates to a yellow ink composition, and more particularly to a yellow ink composition suitable for ink jet recording.

2. Background Art

Various properties are required of images produced by ink compositions, and one of them is lightfastness. When color images are produced using ink compositions, it is common practice to use at least a magenta ink, a yellow ink, and a cyan ink. Each of the inks should meet property requirements that are generally required of ink compositions, for example, stability of composition or properties upon storage. In addition, the inks should produce sharp images on recording media, and the images produced on the recording media should be stable upon storage for a long period of time.

In the production of color images using a plurality of ink compositions, presence of even one color having poor lightfastness causes a change in hue of the printed images. This results in remarkably deteriorated quality of color images. Therefore, more strictly controlled lightfastness is required of color ink compositions.

In recent years, ink jet recording printers have begun to widely spread. Ink jet recording is a printing method wherein droplets of an ink composition are ejected and deposited onto a recording medium, such as paper, to conduct printing. This method has a feature that images having high resolution and quality can be printed at a high speed by means of relatively inexpensive devices. In particular, color ink jet recording devices can provide images having improved quality, are used as output devices for photographs, and have become used as digital printing machines, plotters, CAD output devices and the like. Images printed by ink jet recording printers, which have become widely used, are considered usable in various forms. In particular, photograph-like prints produced by the ink jet recording printers are considered to be put as displays in places exposed to lights from fluorescent lamps or direct sunlight in outdoors and the like for a long period of time. Therefore, lightfastness is a very important property requirement for images produced by ink jet recording.

C.I. Pigment Yellow 74 has hitherto been widely used as a colorant for yellow ink compositons. This pigment is superior especially in yellow color development. However, there is still room for improvement in lightfastness.

Japanese Patent-Laid Open No. 25440/1998 proposes an ink composition, for ink jet recording, containing C.I. Pigment Yellow 154. This publication, however, discloses neither the addition of other pigments including C. I. Pigment Yellow 154 in combination with C.I. Pigment Yellow 74 to the ink composition nor advantages attained thereby.

SUMMARY OF THE INVENTION

The present inventors have now found that the lightfastness of a yellow ink containing C.I. Pigment Yellow 74 can be markedly improved by adding a second yellow pigment. The present invention has been made based on such finding.

Accordingly, it is an object of the present invention to provide a yellow ink composition possessing excellent lightfastness and color development.

The yellow ink composition according to the present invention comprises C.I. Pigment Yellow 74 in combination with at least one second yellow pigment selected from the group consisting of C.I. Pigment Yellow 109, 110, 128, 150, and 154.

DETAILED DESCRIPTION OF THE INVENTION

The ink composition according to the present invention may be used in recording methods using an ink composition. Recording methods using an ink composition include, for example, an ink jet recording method, a recording method using writing utensils, such as pens, and other various printing methods. The ink composition according to the present invention is preferably used in the ink jet recording method.

The yellow ink composition according to the present invention can maintain excellent color development for a long period of time.

According to the present invention, the second yellow pigment is selected from the group consisting of C.I. Pigment Yellow 109, 110, 128, 150, and 154. The ratio of C.I. Pigment Yellow 74 to the second yellow pigment present in the ink composition is not particularly limited. However, the addition of C.I. Pigment Yellow 74 in a relatively large amount is preferred from the viewpoint of color development. The second yellow pigment is generally contained in an amount of 0.2 to 2 parts by weight based on the amount of C.I. Pigment Yellow 74. The upper limit of the amount of the second yellow pigment based on the amount of the C.I. Pigment Yellow 74 is preferably not more than 1 part by weight, more preferably not more than 0.8 part by weight.

The content of the pigment in the ink composition of the present invention is preferably about 1 to 10% by weight, more preferably about 2 to 7% by weight, in terms of the total amount of C.I. Pigment Yellow 74 and the second yellow pigment.

According to a preferred embodiment of the present invention, C.I. Pigment Yellow 74 and the second yellow pigment are added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, a polymeric dispersant. In this connection, that the dispersant and the surfactant contained in the dispersion of the pigment function also as the dispersant and the surfactant for the ink composition will be apparent to a person having ordinary slcill in the art. Preferred examples of polymeric dispersants usable herein include naturally occurring polymers, and specific examples thereof include: proteins, such as glue, gelatin, casein, and albumin; naturally occurring rubbers, such as gum arabic and tragacanth; glucosides, such as saponin; alginic acid and alginic acid derivatives, such as propylene glycol alginate, triethanolamine alginate, and ammonium alginate; and cellulose derivatives, such as methyl cellulose, carboxymethyl cellulose, hydroxyethyl cellulose, and ethylhydroxy cellulose. Preferred polymeric dispersants usable herein include synthetic polymers, and examples thereof include polyvinyl alcohols, polyvinyl pyrrolidones, acrylic resins, such as polyacrylic acid, acrylic acid/acrylonitrile copolymer, potassium acrylate/acrylonitrile copolymer, vinyl acetate/acrylic ester copolymer, and acrylic acid/acrylic ester copolymer, styrene/acrylic resins, such as styrene/acrylic acid copolymer, styrene/methacrylic acid copolymer, styrene/ methacrylic acid/acrylic ester copolymer, styrene/α-methylstyrene/acrylic acid copolymer, and styrene/α-methylstyrene/acrylic acid/acrylic ester copolymer, styrene/maleic acid copolymer, styrene/maleic anhydride copolymer, vinylnaphthalene/acrylic acid copolymer, vinylnaphthalene/maleic acid copolymer, and vinyl acetate copolymers, such as vinyl acetate/ethylene copolymer, vinyl acetate/fatty acid/vinylethylene copolymer, vinyl acetate/maleic ester copolymer, vinyl acetate/crotonic acid copolymer, and vinyl acetate/acrylic acid copolymer, and salts of the above polymers. Among them, a copolymer of a monomer having a hydrophobic group with a monomer having a hydrophilic group and a polymer of a monomer having both a hydrophobic group and a hydrophilic group in its molecular structure are particularly preferred.

A preferred solvent usable in the ink composition according to the present invention comprises water and a water-soluble organic solvent. The water-soluble organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink. The amount of the low-boiling organic solvent added is preferably 1 to 20% by weight, more preferably 1 to 10% by weight, based on the ink.

According to a preferred embodiment of the present invention, the ink composition of the present invention further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; and 1,3-dimethyl-2-imidazolidinone.

The amount of the wetting agent added is preferably 2 to 30% by weight, more preferably 5 to 20% by weight, based on the ink.

The ink composition according to the present invention may contain a saccharide. Specific examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharides" used herein means saccharides in the broad sense as including substances which exist widely in the world of nature, such as alginic acid, α-cyclodextrin, and cellulose. Derivatives of these saccharides usable herein include reducing sugars of the above saccharides (for example, sugar alcohols represented by the general formula $HOCH_2(CHOH)_nCH_2OH$, wherein n is an integer of 2 to 5), oxidizing sugars (for example, aldonic acid or uronic acid), amino acids, and thiosugars. Among them, sugar alcohols are particularly preferred, and specific examples thereof include maltitol and sorbitol. The content of the saccharides is suitably about 1 to 10% by weight based on the ink.

The ink composition according to the present invention may further contain a surfactant. Surfactants usable herein include anionic surfactants (for example, sodium dodecylbenzenesulfonate, sodium laurylate, and an ammonium salt of polyoxyethylene alkyl ether sulfates), nonionic surfactants (for example, polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylenealkylamides), and acetylene glycols (OLFINE Y and Surfynol 82, 104, 440, 465, and 485 (all the above products being manufactured by Air Products and Chemicals Inc.). They may be used alone or in combination of two or more.

If necessary, pH adjustors, preservatives, antimolds, phosphorus antioxidants and the like may be added to the ink composition of the present invention.

The ink composition according to the present invention can be prepared by dispersing and mixing the above components using a suitablemethod. Preferably, the pigment, the polymeric dispersant, and water are first mixed together by means of a suitable dispergator (for example, a ball mill, a sand mill, an attrittor, a roll mill, an agitator mill, a Henschel mixer, a colloid mill, an ultrasonic homogenizer, a jet mill, or an angmill) to prepare a homogeneous pigment dispersion. Subsequently, water, a water-soluble organic solvent, a saccharide, a pH adjustor, a preservative, an antimold and the like are added to and satisfactorily dissolved in the pigment dispersion to prepare an ink solution. After thorough stirring, the ink solution is filtered to remove coarse particles and foreign matter causative of nozzle clogging to obtain a contemplated ink composition.

EXAMPLES

The present invention will be described in more detail with reference to the following examples, though it is not limited to these examples only.

In the following examples, "%" is by weight unless otherwise specified.

Preparation of ink

Pigment ink compositions having the following respective chemical compositions were prepared according to the following procedure. The pigment and the dispersant resin were first mixed together, and the mixture, together with glass beads (diameter: 1.7 mm, amount: 1.5 times (by weight) larger than the mixture), was dispersed for 2 hr in a sand mill (manufactured by Yasukawa Seisalcusho). Thereafter, the glass beads were removed, the other additives were added, and the mixture was then stirred at room temperature for 20 min. The mixture was filtered through a 5 μm membrane filter to prepare an ink composition.

| Example 1 | |
|---|---|
| C.I. Pigment Yellow 74 | 3.7% |
| C.I. Pigment Yellow 154 | 2% |
| Dispersant (styrene/acrylic acid copolymer) | 1.8% |
| | (solid basis) |
| Sucrose | 0.7% |
| Maltitol | 6.3% |
| Glycerin | 10% |
| Diethylene glycol | 3% |
| 2-Pyrrolidone | 2% |
| Pure water | Balance |

-continued

| Example 2 | |
|---|---|
| C.I. Pigment Yellow 74 | 3.3% |
| C.I. Pigment Yellow 154 | 2.4% |
| Dispersant (styrene/acrylic acid copolymer) | 2.2% (solid basis) |
| Sucrose | 0.5% |
| Maltitol | 4.5% |
| Glycerin | 12% |
| Diethylene glycol | 3% |
| Surfynol 465 | 1% |
| Pure water | Balance |

| Example 3 | |
|---|---|
| C.I. Pigment Yellow 74 | 4.0% |
| C.I. Pigment Yellow 154 | 2.0% |
| Dispersant (styrene/acrylic acid copolymer) | 2.8% (solid basis) |
| Glycerin | 10% |
| Diethylene glycol | 3% |
| Triethylene glycol monobutyl ether | 5.0% |
| Surfynol 465 | 1% |
| Pure water | Balance |

| Example 4 | |
|---|---|
| C.I. Pigment Yellow 74 | 3.2% |
| C.I. Pigment Yellow 110 | 2.2% |
| Dispersant (styrene/acrylic acid copolymer) | 2.3% (solid basis) |
| Glycerin | 10% |
| Ethylene glycol | 5% |
| Triethanolamine | 0.7% |
| Surfynol 465 | 1% |
| Diethylene glycol monobutyl ether | 8% |
| Pure water | Balance |

| Example 5 | |
|---|---|
| C.I. Pigment Yellow 74 | 3.8% |
| C.I. Pigment Yellow 128 | 2.0% |
| Dispersant (styrene/acrylic acid copolymer) | 2.0% (solid basis) |
| Glycerin | 12% |
| Diethylene glycol | 2% |
| Triethanolamine | 0.8% |
| Surfynol 465 | 0.8% |
| Triethylene glycol monobutyl ether | 5% |
| Pure water | Balance |

| Example 6 | |
|---|---|
| C.I. Pigment Yellow 74 | 2.8% |
| C.I. Pigment Yellow 150 | 2.0% |
| Dispersant (styrene/acrylic acid copolymer) | 1.6% (solid basis) |
| Glycerin | 10% |
| Diethylene glycol | 5% |
| Triethanolamine | 0.8% |
| Surfynol 465 | 1.0% |
| Triethylene glycol monobutyl ether | 10% |
| Pure water | Balance |

| Comparative Example 1 | |
|---|---|
| C.I. Pigment Yellow 74 | 4.5% |
| Dispersant (styrene/acrylic acid copolymer) | 1.8% (solid basis) |
| Sucrose | 0.3% |
| Maltitol | 2.7% |
| Glycerin | 15% |
| Surfynol 465 | 1% |
| Diethylene glycol monobutyl ether | 8% |
| Pure water | Balance |

| Comparative Example 2 | |
|---|---|
| C.I. Pigment Yellow 138 | 4.2% |
| Dispersant (styrene/acrylic acid copolymer) | 2.1% (solid basis) |
| Sucrose | 0.4% |
| Maltitol | 3.6% |
| Glycerin | 14% |
| Diethylene glycol | 3% |

-continued

| | |
|---|---|
| Surfynol 465 | 0.8% |
| Pure water | Balance |

Evaluation test on inks

Properties of the ink compositions were evaluated as follows. Printing was carried out by means of an ink jet printer "MJ-930C" manufactured by Seiko Epson Corp. at a density of 360 dpi x 360 dpi with the weight of the ink ejected per dot being 0.040 $\mu$g.

Evaluation 1: Lightfastness

Blotted images (100% duty) were printed on a specialty printing medium for ink jet recording (a specialty gloss film, manufactured by Seiko Epson Corp.). The lightfastness of the prints thus obtained was evaluated under the following conditions.

The prints were first irradiated with light by means of a xenon weather-o-meter Ci35A (manufactured by ATLAS) under conditions of black panel temperature 63° C., relative humidity 50%, and 340 nm ultraviolet irradiance 0.35 W/m$^2$.

The irradiation time was 284 hr at 360 kJ/m$^2$ or 568 hr at 720 kJ/m$^2$.

After the irradiation, the reflection density of the prints was measured with a spectrophotometer GRETAG SPM (manufactured by GRETAG) under conditions of light source D50, provision of no light source filter, absolute white as reference white, and angle of visibility 2°. The percentage residual density was evaluated according to the following criteria.

A: More than 90%

B: 80 to less than 90%

C: Less than 80%

Evaluation 2: Evaluation of color development

For the blotted images formed in connection with evaluation A, measurement was carried out with a spectrophotometer GRETAG SPM (manufactured by GRETAG) to determine the coordinates of the L*a*b* color system in the color difference indication method specified in CIE (commission International de l'Eclairage). From a* and b* thus obtained, the chroma C* was determined according to the following equation.

$$C^* = [(a^*)^2 + (b^*)^2]^{1/2}$$

The results were evaluated according to the following criteria.

A: C*>110

B: 110≧C*≧100

C: C*<100

TABLE

| | Results of evaluation | | |
|---|---|---|---|
| | Evaluation 1 | | |
| | 360KJ | 720KJ | Evaluation 2 |
| Example 1 | A | A | A |
| Example 2 | A | A | A |
| Example 3 | A | A | A |
| Example 4 | A | A | A |
| Example 5 | A | A | A |
| Example 6 | A | A | A |

TABLE-continued

| | Results of evaluation Evaluation 1 | | Evaluation 2 |
|---|---|---|---|
| | 360KJ | 720KJ | |
| Comparative Example 1 | A | C | A |
| Comparative Example 2 | B | C | C |

What is claimed is:

1. A yellow ink composition comprising: C.I. Pigment Yellow 74; and at least one second yellow pigment selected from the group consisting of C.I. Pigment Yellow 109, 110, 128, 150, and 154.

2. The yellow ink composition according to claim 1, which comprises C. I. Pigment Yellow 74 and the second yellow pigment in a ratio of 1:0.2 to 1:2.

3. A recording method comprising the step of depositing an ink composition onto a recording medium to perform printing, wherein the ink composition is one according to claim 1.

4. An ink jet recording method comprising the steps of: ejecting a droplet of an ink composition; and depositing the droplet onto a recording medium to perform printing, wherein the ink composition is one according to claim 1.

5. A recording method comprising the step of depositing an ink composition onto a recording medium to perform printing, wherein the ink composition is one according to claim 2.

6. An ink jet recording method comprising the steps of: ejecting a droplet of an ink composition, and depositing the droplet onto a recording medium to perform printing, wherein the ink compositon is one according to claim 2.

7. A yellow ink composition comprising water in a major amount, a water-soluble organic solvent in an amount of about 1 to 20% by weight, and a yellow pigment in an amount of about 1 to 10% by weight, said yellow pigment comprising C.I. Pigment Yellow 74 and at least one second yellow pigment selected from the group consisting of C.I. Pigment Yellow 109, 110, 128, 150, and 154.

8. The yellow ink composition according to claim 7, which comprises C.I. Pigment Yellow 74 and the second yellow pigment in a ratio of 1:0.2 to 1:2.

9. The yellow ink composition according to claim 8, further comprising a polymeric dispersant.

10. The yellow ink composition according to claim 9, further comprising a wetting agent in an amount of about 2 to 30% by weight.

11. The yellow ink composition according to claim 10, further comprising a saccharide in an amount of about 1 to 10% by weight.

12. A yellow ink composition according to claim 7, wherein the ink composition consists essentially of the water-soluble organic solvent, the yellow pigment and water.

13. A printed medium comprising a recording medium with print formed thereon, said print being formed on the recording medium by depositing the composition of claim 1 onto the recording medium.

14. A printed medium comprising a recording medium with print formed thereon, said print being formed on the recording medium by depositing the composition of claim 2 onto the recording medium.

15. A printed medium comprising a recording medium with print formed thereon, said print being formed on the recording medium by depositing the composition of claim 7 onto the recording medium.

16. A printed medium comprising a recording medium with print formed thereon, said print being formed on the recording medium by depositing the composition of claim 17 onto the recording medium.

* * * * *